(12) United States Patent
Lee et al.

(10) Patent No.: US 11,027,776 B2
(45) Date of Patent: Jun. 8, 2021

(54) SYSTEM AND METHOD FOR ADAPTING PARAMETERS USED IN TARGET SLIP ESTIMATION

(71) Applicant: GM GLOBAL TECHNOLOGY OPERATIONS LLC, Detroit, MI (US)

(72) Inventors: Joonho Lee, Troy, MI (US); Qingrong Zhao, Madison Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 16/508,754

(22) Filed: Jul. 11, 2019

(65) Prior Publication Data

US 2021/0009201 A1    Jan. 14, 2021

(51) Int. Cl.
*B62D 6/00*      (2006.01)
*B60W 40/064*    (2012.01)
(Continued)

(52) U.S. Cl.
CPC ........... *B62D 6/006* (2013.01); *B60W 40/064* (2013.01); *B60W 40/068* (2013.01); *G06F 16/903* (2019.01)

(58) Field of Classification Search
CPC .. B60W 40/064; B60W 40/068; B60W 40/06; B60W 2520/04; B60W 2520/20;
(Continued)

(56) References Cited

U.S. PATENT DOCUMENTS

2015/0284006 A1* 10/2015 Singh ................. G01M 17/02
                                                        702/41
2016/0244068 A1*  8/2016 Thor .................. B60W 40/101
(Continued)

FOREIGN PATENT DOCUMENTS

EP        3090908 A1 * 11/2016   .......... B60T 8/17616
WO  WO-2013158252 A1 * 10/2013   .......... B60W 40/068

*Primary Examiner* — Thomas G Black
*Assistant Examiner* — Brandon Z Willis
(74) *Attorney, Agent, or Firm* — LorenZ & Kopf LLP

(57) ABSTRACT

Systems and methods are provided for generating adapted tuning parameters for target slip estimation, the parameters being adapted to real-time road surface conditions. The method includes, receiving, from a road surface detection module, a road surface condition, $S_n$, from among N road surface conditions S, range of friction, mu, and a confidence level, Ci. The method receives sensor system data from a sensor system, and determines, as a function of $S_n$, range of mu, and Ci, initial estimator values including an estimated initial frictional force $\hat{\Theta}(0)$, an initial gain, $P_0$, and an initial projected range of signal bounds, ($P_u$) and ($P_l$). The method tunes (i.e., adapts) the initial estimator values to generate therefrom adapted tuning parameters based on received inputs. The method outputs adapted tuning parameters.

19 Claims, 3 Drawing Sheets

(51) Int. Cl.
*B60W 40/068* (2012.01)
*G06F 16/903* (2019.01)

(58) Field of Classification Search
CPC ......... B60W 2520/26; B60W 2720/26; B60W 2720/20; B60W 2400/00; B60W 2510/18; B60W 2555/20; B60W 2556/20; B60W 2710/18; B60W 30/02; B60W 2552/40; B60W 2520/28; B60T 2210/10; B60T 2210/12; B60T 2210/124; B60T 8/172; B60T 2230/02; B60T 2240/02; B62D 6/006; G06F 16/90
See application file for complete search history.

(56) References Cited

U.S. PATENT DOCUMENTS

2018/0217050 A1\* 8/2018 Heil ........................ G01N 19/02
2019/0047527 A1\* 2/2019 Falconer ............... B60W 10/06

\* cited by examiner

SYSTEM AND METHOD FOR ADAPTING PARAMETERS USED IN TARGET SLIP ESTIMATION

TECHNICAL FIELD

The present disclosure generally relates to estimating a target slip for mobile platforms, and more particularly relates to systems and methods for generating adapted parameters used in estimating the target slip based on real-time surface conditions.

To maximize vehicle tracking performance and to minimize braking distance, knowledge of maximum tire forces (before tire saturation) is required. Often the values of the actual tire forces are not known, so they are estimated.

One of the tire forces that is important for vehicle stability control is target slip or target grip. Estimating a target slip is often performed in a target slip estimator module, and performed using an algorithm. Currently, most target slip estimation algorithms employ models that do not adapt to dynamically changing driving conditions, such as, real-time changes in road surface conditions. This limitation is a technological problem that can result in inferior target slip estimations, which leads to inferior target slip estimator module performance.

Accordingly, it is desirable to provide improved systems and methods for tire slip limit estimation. The following disclosure provides technological solutions to this problem, in addition to addressing related issues. Furthermore, other desirable features and characteristics of the system and method will become apparent from the subsequent detailed description and the appended claims, taken in conjunction with the accompanying drawings and the preceding background.

SUMMARY

In accordance with a first embodiment, a system for generating adapted tuning parameters for use by a target slip estimator module in a vehicle is provided. The system includes: a road surface detection module for providing a road surface condition, $S_n$, range of friction, mu, and a confidence level, Ci, between 0 and 1; a sensor system for providing sensor system data; and a controller module in operative communication with the road surface detection module and the sensor system, and programmed to: receive the $S_n$, range of mu, and Ci; receive the sensor system data; determine, as a function of $S_n$, range of mu, and Ci, initial estimator values including an estimated initial frictional force, $\hat{\Theta}(0)$ and an initial projected range of signal bounds, ($P_u$ and $P_l$); determine an initial gain $P_0$ as a function of the sensor system data; generate a set of adapted tuning parameters for an estimation method employed by the target slip estimator module, the set of adapted tuning parameters being a function of $\hat{\Theta}(0)$, $P_0$, and $P_u$ and $P_l$; and output the set of adapted tuning parameters.

In an embodiment, the controller module is further configured to: compare Ci to a preprogrammed confidence threshold Ct; determine that Ci is high when it is $\geq$Ct; and determine that Ci is low when it is <Ct.

In an embodiment, the controller module is further configured to determine, as a function of $S_n$, range of mu, and Ci, an initial forgetting factor, $\beta_0$, for a recursive least squares estimation method.

In an embodiment, the controller module is further configured to generate an adapted parameter β by adapting $\beta_0$ as a function of Ci.

In an embodiment, $S_n$ is one of N road conditions, S, and the system further includes: a database for storing data comprising, for each combination of $S_n$ and Ci: respective initial estimator values; and wherein the controller module determines the $\hat{\Theta}(0)$, $\beta_0$, and $P_u$ and $P_l$ by referencing the data using $S_n$ and Ci.

In an embodiment, the controller module generates adaptive parameter β by widening $\beta_0$, as a function of Ci when Ci is low.

In an embodiment, the controller module is further programmed to widen the estimated initial frictional force, $\hat{\Theta}(0)$, as a function of Ci when Ci is low.

In an embodiment, the controller module is further programmed to widen the projection range of signal bounds, $P_u$ and $P_l$, to plus or minus Δp, as a function of the estimated frictional force $\hat{\Theta}(0)$ when Ci is low.

In accordance with another embodiment, a method for generating adapted tuning parameters for a target slip estimator module for a vehicle is provided. The method including: at a controller module, receiving, from a road surface detection module, a road surface condition, $S_n$, range of friction, mu, and a confidence level, Ci that is between 0 and 1; receiving sensor system data from a sensor system; determining, as a function of $S_n$, range of mu, and Ci, initial estimator values including an estimated initial frictional force, $\hat{\Theta}(0)$, and an initial projected range of signal bounds, ($P_u$ and $P_l$); determining an initial gain $P_0$ as a function of the sensor system data; generating a set of adapted tuning parameters for an estimation method employed by the target slip estimator module, the set of adapted tuning parameters being a function of $\hat{\Theta}(0)$, $P_0$, and $P_u$ and $P_l$; and outputting the set of adapted tuning parameters.

In an embodiment, $S_n$ is one of N road conditions, S, and further including: storing, in a database, previously developed data comprising, for each combination of $S_n$ and Ci: respective initial estimator values; and wherein determining the $\hat{\Theta}(0)$, and $P_u$ and $P_l$ comprises referencing the previously developed data using $S_n$ and Ci.

In an embodiment, further including: comparing Ci to a preprogrammed confidence threshold Ct; determining that Ci is high when it is $\geq$Ct; and determining that Ci is low when it is <Ct.

In an embodiment, further including widening the estimated initial frictional force, $\hat{\Theta}(0)$, as a function of Ci when Ci is low.

In an embodiment, further including generating Δp by widening the projection range of signal bounds, $P_u$ and $P_l$, as a function of the estimated frictional force when Ci is low.

In an embodiment, wherein the estimation method employed by the target slip estimator module is recursive least squares, and further including: determining an initial forgetting factor, $\beta_0$; and generating an adapted tuning parameter, β, by widening $\beta_0$, as a function of Ci.

In an embodiment, further including determining the $\beta_0$ by referencing the data using $S_n$ and Ci.

Also provided is a vehicle, including: a road surface detection module for providing a road surface condition, $S_n$, range of friction, mu, and a confidence level, Ci, between 0 and 1; a sensor system for providing sensor system data; and a controller module in operative communication with the road surface detection module and the sensor system, and programmed to: receive the $S_n$, range of mu, and Ci; receive the sensor system data; determine, as a function of $S_n$, range of mu, and Ci, initial estimator values including an estimated initial frictional force, $\hat{\Theta}(0)$, and an initial projected range of signal bounds, ($P_u$ and $P_l$); determine an initial gain $P_0$ as a function of the sensor system data; generate a set of adapted tuning parameters for an estimation method employed by the target slip estimator module, the set of adapted tuning parameters being a function of $\hat{\Theta}(0)$, $P_0$, and $P_u$ and $P_l$; and output the set of adapted tuning parameters.

In an embodiment, the controller module is further configured to: compare Ci to a preprogrammed confidence threshold Ct; determine that Ci is high when it is >=Ct; and determine that Ci is low when it is <Ct.

In an embodiment, wherein $S_n$ is one of N road conditions, S, and further comprising: a database for storing previously developed data comprising, for each combination of $S_n$ and Ci: respective initial estimator values; and wherein the controller module is further programmed to determine the $\hat{\Theta}(0)$, and $P_u$ and $P_l$ by referencing the previously developed data using $S_n$ and Ci.

In an embodiment, the controller module further: determines, as a function of $S_n$, range of mu, and Ci, an initial forgetting factor, $\beta_0$; and generates and adapted tuning parameter, $\beta$, by widening $\beta_0$, when Ci is low.

In an embodiment, the controller module is further programmed to determine the $\beta_0$ by referencing the data in the database using $S_n$ and Ci.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the functionality attributed to the module. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
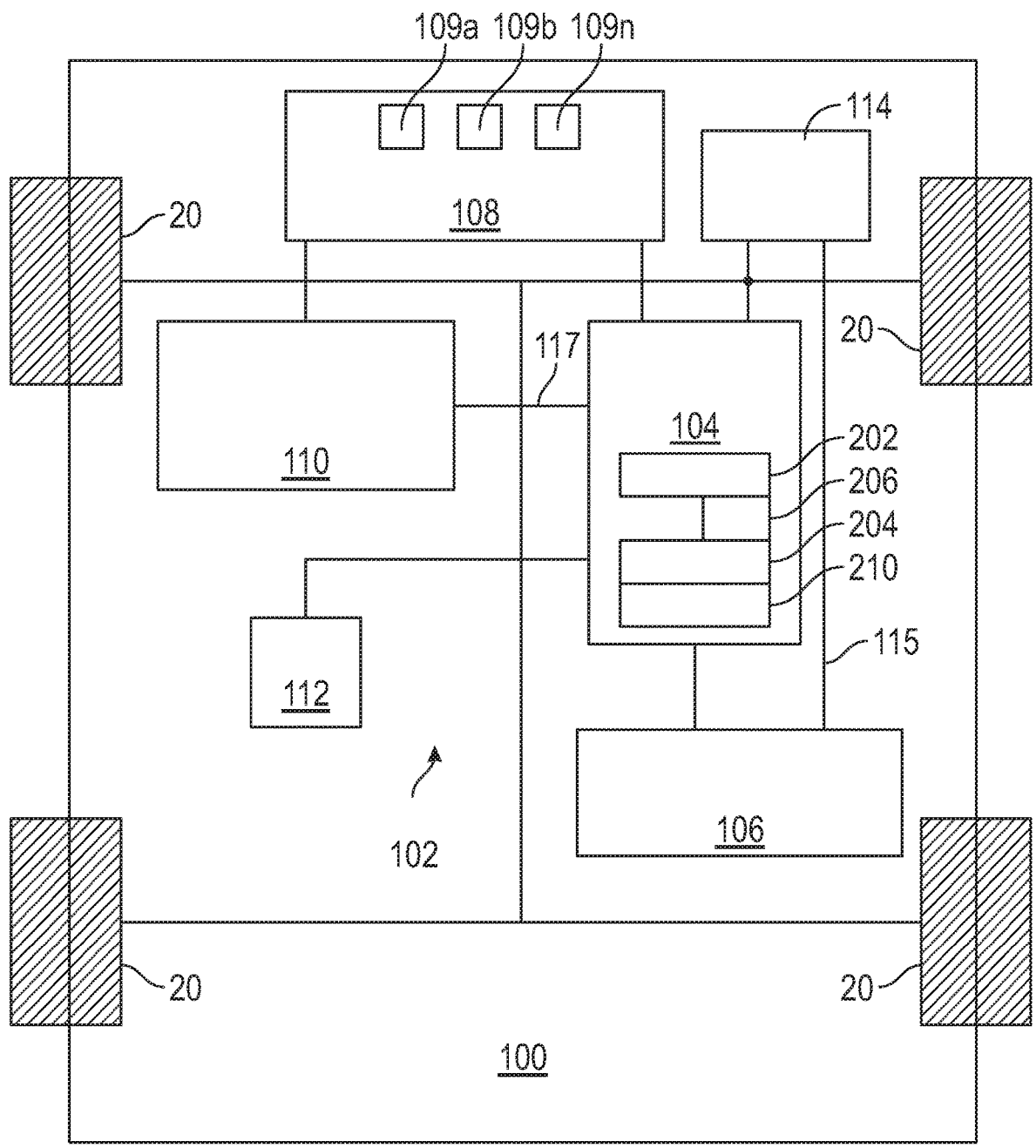
FIG. 1 is a schematic diagram illustrating a vehicle that includes an adapted parameter system for a target slip estimator, in accordance with various embodiments.

FIG. 1 depicts an example mobile platform. The example mobile platform is a vehicle 100 that is capable of movement and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels, each of which are rotationally coupled to the chassis near a respective corner of the body. The vehicle 100 is depicted with four wheels 20, but the number of wheels 20 may vary in other embodiments. The vehicle 100 may be autonomous or semi-autonomous.

The example vehicle 100 includes a number of communicatively coupled components. Non-limiting examples of the communicatively coupled components include a sensor system 108, a road surface detection module 110, a target slip estimator module 106, at least one data storage device, a database 112, the proposed controller module 104, and drive systems 114. The collective functional block "drive systems" 114 generally includes known vehicle systems for vehicle operation, such as, a propulsion system, a transmission system, a steering system, actuators for the wheels, and a brake system, and generates a variety of signals, including vehicle speed and vehicle acceleration. The drive systems 114 and other on-board systems provide signals to the target slip estimator module 106 from which the target slip estimator module 106 generates, as an output, a target slip estimation. On-board systems, such as the drive systems 114, receive the target slip estimation and utilize it to control various aspects of vehicle 100 operation, for example, by controlling traction devices associated with the wheels and brakes.

The vehicle 100 includes a system for adapting parameters used in target slip estimation based on road surface conditions, shown generally as "system" 102. As described in greater detail below, the system 102 adaptively, in real-time, and responsive to detected surface conditions, adapts parameters that the target slip estimator module 106 uses in generating the target slip estimation. More specifically, the system 102 generates, as an output, adapted parameters for use by the target slip estimator module 106 to generate the target slip estimation. A controller module 104, described in more detail below, may perform the processing steps of operations attributed to the system 102. The functions and operations of each of these components are described in more detail below.

The sensor system 108 includes one or more sensing devices 109a-109n that sense observable conditions of the exterior environment (such as surface condition, precipitation, light level, distance to objects, and the like) and/or the interior environment of the vehicle 100 (such as the state of one or more occupants) and generate sensor data relating thereto. The sensing devices 109a-109n might include, but are not limited to, radars (e.g., long-range, medium-range-short range), lidars, global positioning systems (GPS), optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. Non-limiting examples of characteristics that may be embodied in the sensor system data include amount of precipitation, unevenness of the surface, presence of ice, presence of water, panoramic view, amount of light, etc.

To provide background information, the operations of the road surface detection module 110 are described. The road surface detection module 110 operates in real-time to receive, from the sensor system 108, sensor system data, and analyze the characteristics that may be embodied in the sensor system data to identify a road surface condition, $S_n$, from among N predefined road surface conditions, S. The road surface detection module 110 then generally associates the surface condition type, $S_n$ with conditions, such as, a range for road coefficient of friction, mu; in various embodiments, this may be based on an access to a pre-programmed lookup table (see, for example, Table 1) to. In various embodiments, the confidence level is a fractional number between 0 and 1. Outputs from the road surface detection module 110 are: $S_n$, range of mu, and Ci.

TABLE 1 example lookup table in road surface detection module.

| Surface Condition Type, $S_n$ | Conditions, e.g., Range for road coefficient of friction, mu |
|---|---|
| Dry | 0.2-0.3 |
| Wet | 0.9-0.12 |
| Snow | 0.02-0.3 |

In a simplified example of road surface detection module 110 operation, a detected (i.e., sensed) amount of precipitation and detected amount of water present may be characteristics embodied in the sensor system data that define a "wet" surface condition $S_n$. With reference to Table 1, the road surface detection module 110 may output "wet," the range 0.4-0.7, and a confidence level, Ci. As may be appreciated, the outputs $S_n$, range of mu, and Ci may vary in real-time, reflective of the detected surface condition and confidence level.

As used herein, the term "controller module" refers to any means for facilitating communications and/or interaction between the components of the system 102 and performing additional processes, tasks and/or functions to support operation of the system 102, as described herein. Depending on the embodiment, the controller module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

In various embodiments, the controller module 104 is realized as an enhanced computer system, comprising a memory 204 for storage of instructions, algorithms, and/or programs, such as adapted parameter program 210, a processor 202 to execute the program 210, and input/output interface (I/O) 206. The computer readable storage device or media, memory 204, and database 112, may each include volatile and nonvolatile storage in read-only memory (ROM), random-access memory (RAM), and keep-alive memory (KAM), for example. KAM is a persistent or nonvolatile memory that may be used to store various operating variables while the processor 202 is powered down. The computer-readable storage device or memory 204 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller module 104 in controlling the vehicle 100. In various embodiments, controller module 104 is configured to implement the system 102.

Controller module 104 may employ a computer readable storage media, such as the database 112, to store and maintain, for each combination of $S_n$ and Ci: a set of initial tuning parameters for use by the target slip estimator module 106. The initial tuning parameters may include, an estimated initial frictional force, $\hat{\Theta}(0)$, an initial gain, $P_0$, and an initial projected range of signal bounds, $(P_u)$ and $(P_l)$. In embodiments for use with a target slip estimator module 106 that employs a recursive least squares (RLS) estimation method, the controller 104 may store and maintain an initial forgetting factor, $\beta_0$. The values for the initial tuning parameters are developed prior to installation and operation of the system 104, based on data gathering during vehicle performance testing across the suite of N road surface conditions S. In an exemplary embodiment, the initial estimator values may be stored as a lookup table.

Figure 2:
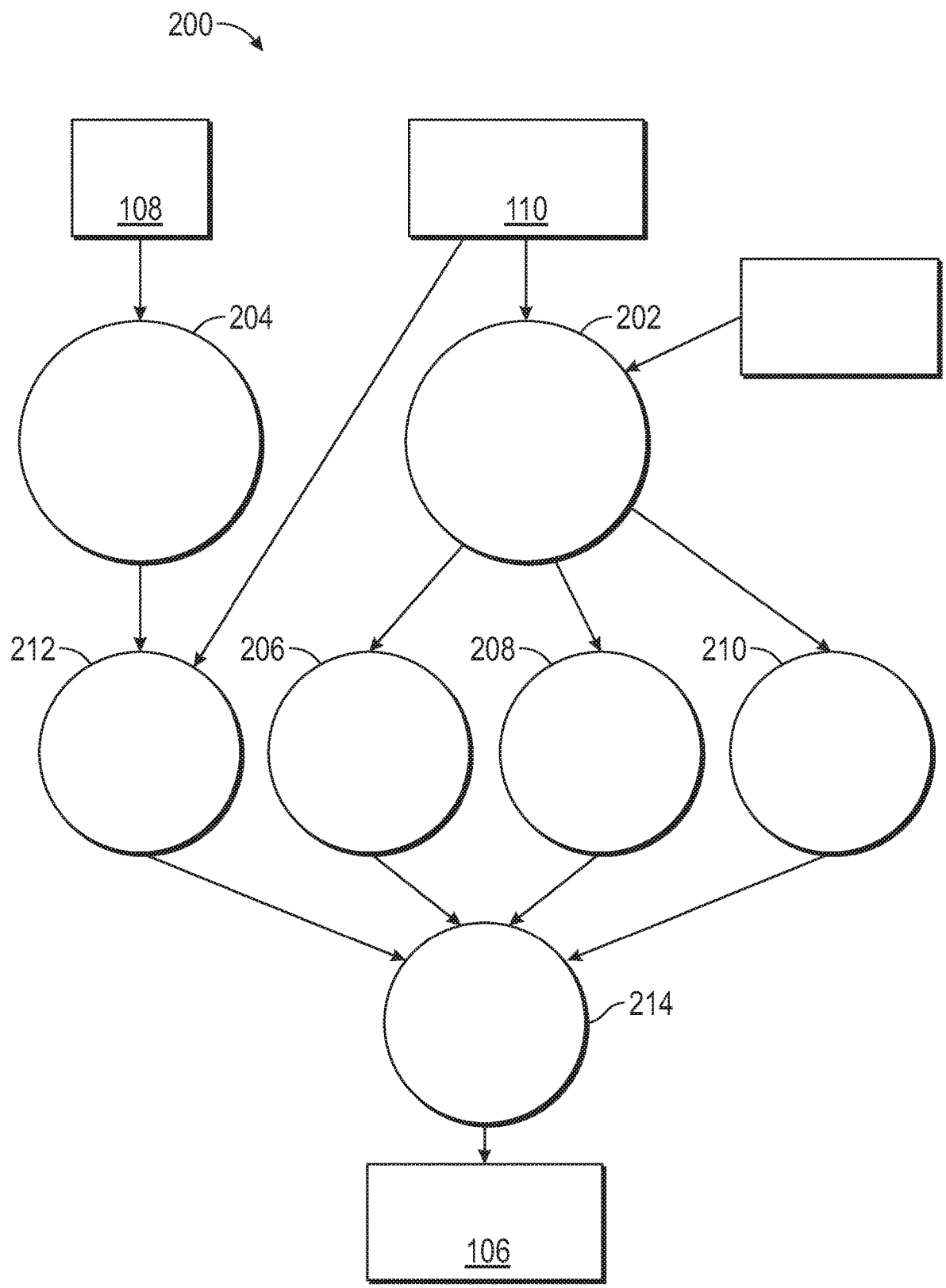
FIG. 2 is a data flow diagram for an adapted parameter system, in accordance with an exemplary embodiment.

Information in the memory 204 and/or database 112 may be organized and/or imported from an external source during an initialization or installment operation in a method; it may also be programmed via a user input device. Within the controller module 104, the input/output interface (I/O) 206 enables intra-controller module communication, as well as communications between the controller module and other components in operable communication with the controller module 104. The input/output interface (I/O) 206 may include one or more network interfaces and can be implemented using any suitable method and apparatus. In various embodiments, the input/output interface (I/O) 206 supports communication with technicians, and/or one or more storage interfaces for direct connection to storage apparatuses, such as the database 112. In embodiments as shown in FIG. 2, during operation of the controller module 104, the processor 202 loads and executes one or more algorithms, instructions, and rules embodied as program 210, and, as such, controls the general operation of the system 102.

The controller module 104 is programmed to receive the sensor data from the sensor system 108, and $S_n$, range of mu, and Ci (collectively labeled inputs 117) from the road surface detection module 110. The controller module 104 is programmed to generate adapted tuning parameters (also referred to as estimator values herein) as a function of the sensor system data, the adapted tuning parameters being adapted specifically for the estimation method employed by the target slip estimator module 106, as described below. Depending on the embodiment of the controller module 104, it may perform operations in accordance with an algorithm for adapted parameters, perform operations in accordance with state machine logic, perform operations in accordance with logic in a programmable logic array, or the like.

The target slip estimator module 106 is operable to generate slip limit estimations, λ, using an estimation method that operates on received parameters. When the provided system 104 is employed, the adapted tuning parameters generated by the controller module 104 are sent to the target slip estimator module 106 to thereby serve as the parameters used in the estimation method. Since the adapted tuning parameters are adapted in response to real-time road surface conditions, this enables the target slip estimator module 106 to generate faster, more accurate, and more reliable slip limit estimations, λ, than conventional target slip estimators. Although shown as a separate functional block, in various embodiments, the target slip estimator module 106 is integrated with the system 102.

While the exemplary embodiment of FIG. 1 is described in the context of a controller module 104 embodied as fully functioning enhanced computer system, those skilled in the art will recognize that the mechanisms of the present disclosure are capable of being distributed as a program product including program 210. Such a program product may comprise an arrangement of instructions organized as multiple interdependent program code modules, each to achieve a separate process, arranged to manage data flow through the system 102 (see, FIG. 2). The program code modules may each comprise an ordered listing of executable instructions for implementing logical functions for the processes performed by the system 102. The instructions, when executed by a processor, cause the processor to receive and process signals, and perform logic, calculations, methods and/or algorithms as described herein for automatically and in real-time generating adapted parameters for use by the target slip estimator module 106.

Once developed, the program code modules constituting program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Turning now to FIG. 2 a data flow diagram 200 illustrates an exemplary arrangement for the processes performed by the system 102. Process 202 uses data from the road surface detection module 110 and previously developed data to generate a set of adapted tuning parameters, functions of $\hat{\Theta}(0)$, $P_0$, and $P_u$ and $P_l$, as described hereinbelow; the initial estimator values are near a target slip estimation.

Process 204 uses received sensor system data to determine an initial estimator value for gain, $P_0$. At process 204, on-board and real-time sensor data is received from the sensor system 108; this data (z) includes signal and noise. An initial estimator value for gain, $P_0$ is determined as a function of the sensor system data (z). Process 212 generates an adapted gain, tuning $P_0$ as a function Ci.

The initial estimator values from process 204 may flow to tuning processes 206, 208, and 210, to thereby generate components of the set of adapted tuning parameters.

In various embodiments, process 208 tunes the initial projected range of signal bounds, ($P_u$) and ($P_l$) to generate therefrom an adapted tuning parameter ΔP, also referred to as the adapted projection range. The projection range has an upper bound and a lower bound. To determine the adapted projection range, the system 102 processes $S_n$ and Ci to setup initial estimations of signal bounds, ($P_u$) and ($P_l$), near a target slip. The system 102 adaptively generates, in real-time, an estimated initial projected range of signal bounds around the target slip. The estimations are constrained by the initial conditions (e.g., the ranges of mu associated with the $S_n$).

The various initial projected ranges around the target slip are shown in Equation 1, below:

$$\hat{\theta} = Proj[P\epsilon\phi] = \begin{cases} P\epsilon\phi & \text{if conditions1} \\ \left(1 + \frac{b_u - \theta}{\delta}\right)\phi & \text{if conditions 2} \\ \left(1 + \frac{\theta - a_l}{\delta}\right)\phi & \text{if conditions 3} \end{cases}$$

In some embodiments, process 210 tunes the initial forgetting factor, $\beta_0$, generating adapted tuning parameter β. At process 210, the forgetting factor β is calculated as a function of Ci.

The controller module 104 compares Ci to a preprogrammed confidence threshold Ct. In various embodiments, the confidence level is considered high when Ci is greater than or equal to the preprogrammed confidence threshold Ct. In an embodiment, Ct is 70% or 0.70.

In various embodiments, when Ci is greater than or equal to Ct (i.e., high confidence in the detected road surface condition, $S_n$), the system 102 utilizes the initial estimator values as the set of adapted tuning parameters to output via process 214. For example, for a value of $S_n$ with Ci greater than or equal to Ct, the adapted tuning parameters for $S_n$ may include: the estimated initial frictional force, $\hat{\Theta}(0)$, the initial projected range of signal bounds, ($P_u$) and ($P_l$), and initial forgetting factor, $\beta_0$.

When Ci is less than Ct, (i.e., lower confidence in the detected road surface condition, $S_n$) the controller module 104 adjusts/adapts the initial estimator values to generate the set of adapted tuning parameters for $S_n$ to output via process 214. For example, generating the set of adapted tuning parameters for a $S_n$ with lower confidence (Ci<Ct), may include the following processing steps:

(1) Widening the range of the estimated initial frictional force, $\hat{\Theta}(0)$, (FIG. 2, process 206) as shown in Equation 2, below:

$$-\Delta + \hat{\theta}_g \leq \hat{\theta}(0) \leq \Delta + \hat{\theta}_g$$

where Δ and $\hat{\theta}_g$ are previously programmed initial guess ranges that the controller 104 selects as a function of the confidence level Ci:

(2) Widening the projection range of signal bounds, ($P_u$) and ($P_l$), (FIG. 2, 208) as shown in Equation 3, below:

$$-\Delta_p + \hat{\theta}_l(t) \leq \hat{\theta}(t) \leq \hat{\theta}_u(t) + \Delta_p$$

where $-\Delta p$ is equal to $P_l$, and $\Delta p$ is equal to $P_u$ and where $\hat{\Theta}_l(t)$ and $\hat{\Theta}_u(t)$ are the widened estimated initial frictional force values, as a function of time, from equation 2 above, and (3) In embodiments that generate adapted tuning parameters for a RLS estimation method, adaptive parameter β is increased over the initial estimator value $\beta_0$, as shown in Equation 3, (FIG. 2, 210) below:

$$\Delta_f + \beta_o \le \beta$$

where $\Delta_f$ s a pre-programmed range of forgetting factors determined by the controller 104 as a function of the confidence level Ci.

Process 214 receives the generated (i.e., tuned) data from processes 206, 208, 210, and 212, and makes it available as data output for the target slip estimator 106. Each of the processes 202-214 may be performed by the system 102, in accordance with steps of a method, described in more detail below. The outputs from the controller module 104 are the set of the adapted tuning parameters, functions of $\hat{\Theta}(0)$, $P_0$, and $P_u$ and $P_l$, and which are for use by a target slip estimation method employed by the target slip estimator module 106.

Figure 3:
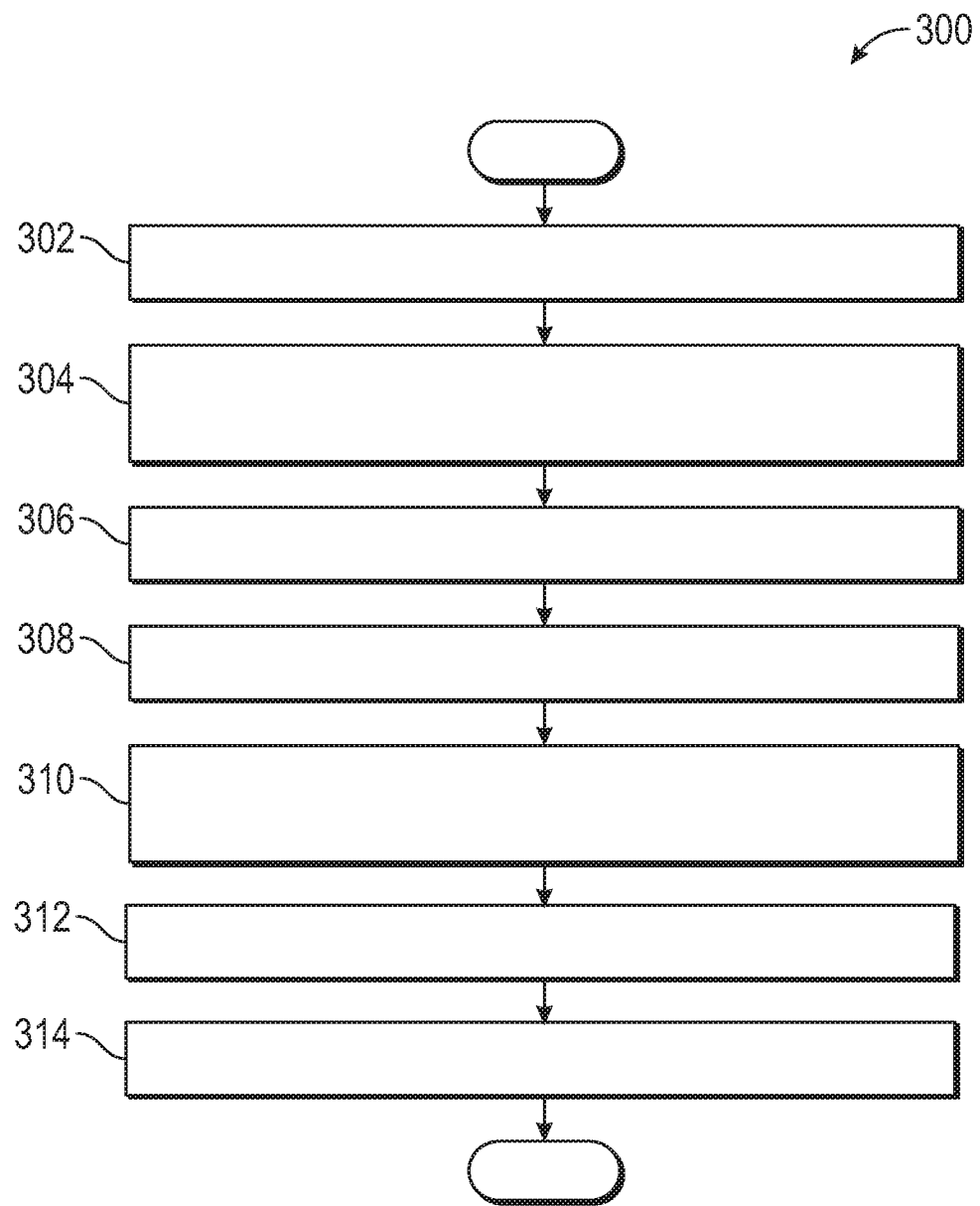
FIG. 3 is a process flow chart depicting an example method for parameter adaptation for a target slip estimator module in a vehicle, in accordance with various embodiments.

Turning now to FIG. 3, the system 102 described above may be implemented by a processor-executable method for adapting parameters used in target slip estimation, shown generally as method 300. For illustrative purposes, the following description of method 300 may refer to elements mentioned above in connection with FIGS. 1-2. In practice, portions of method 300 may be performed by different components of the described system. It should be appreciated that method 300 may include any number of additional or alternative operations and tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

As may be appreciated, prior to the method 300 starting, the controller module 104 is initialized. When implemented using enhanced computer systems (e.g., FIG. 2), initialization may comprise uploading, installing, or updating the instructions constituting the program 210 for execution by the processor 202.

At operation 302, a surface type, $S_n$, range of mu, and $C_i$ are received by the controller module 104. At 304, the previously developed data, from vehicle performance testing across the suite of N road surface conditions S, is referenced. As mentioned above, the database 112 may be used to store this previously developed data. At 304, responsive to referencing the previously developed data using the received $S_n$ and Ci, the controller module 104 determines initial estimator values including: an estimated initial frictional force, $\hat{\Theta}(0)$, an initial projected range of signal bounds, $(P_u)$ and $(P_l)$, and, in some embodiments, an initial forgetting factor, $\beta_0$.

At operation 306, the sensor system data is received, and at operation 308, an initial estimation value for gain, P0, is determined as a function of the sensor system data.

In operation 312, the controller module 104 utilizes the processes described in connection with FIG. 2 to generate the set of adapted tuning parameters based on the initial estimator values. In doing so, the controller module 104 must first ascertain what estimation method the target slip estimator module 106 is going to use. In some embodiments, this may be a formal operational step 310. In other embodiments, the estimation method used by the target slip estimator module 106 may be preprogrammed into the instructions of the controller module 104. As mentioned, the adapted tuning parameters may include any combination of two or more of:

an estimated initial frictional force, $\hat{\Theta}(0)$ is from the range of mu an estimated initial gain, $P_0$ an initial projection range of signal bounds, $(P_u)$ and $(P_l)$, and an initial forgetting factor, $\beta_0$, is from the previously developed data.

As may be appreciated from the above discussion, the controller module 104 is said to generate adapted tuning parameters because it determines how and when to adapt the initial estimator values from the previously developed data for use by the target slip estimator module 106.

In some embodiments, the target slip estimator module 106 may be included in the system 102. As stated, the adapted parameters that are functions of $\hat{\Theta}(0)$, $P_0$, and $P_u$ and $P_l$ are received by the target slip estimator module 106. Target slip estimator modules 106 may employ various slip estimation methods, so the particular set of adapted tuning parameters generated by the controller 104 may vary by embodiment. Recall, as mentioned, in various embodiments, the target slip estimator module 106 employs a recursive least squares analysis (RLS). The slip limit estimation, λ, is generated by a target slip estimator module 106 that employs the RLS method of slip estimation. The RLS method may be employed in accordance with Equation 5, below:

$$\dot{\theta} = P\epsilon\phi, \epsilon = z - \hat{z},$$

$$\dot{\theta} = Proj[P\epsilon\phi] = \begin{cases} P\epsilon\phi & \text{if conditions1} \\ \left(1 + \frac{b_u - \theta}{\delta}\right)\phi & \text{if conditions 2} \\ \left(1 + \frac{\theta - a_l}{\delta}\right)\phi & \text{if conditions 3} \end{cases}$$

$$\dot{P} = \beta P - P\phi\phi^T P$$

The adaptation gain (or the initial condition of P) may be determined by the controller 104 as a function of the confidence level Ci; if the confidence level is low, a high value of the adaptation gain is used, and when the confidence level is high, a low value is used for the adaptation gain. As can be seen in the above equations, the forgetting factor β affects how fast accumulated data is refreshed (P), and it also keeps the adaptation gains, high.

As mentioned above, the functional improvement in target slip estimation that is achieved by using the adapted parameters generated by the system 102 is a faster, more accurate, and more reliable slip limit, λ, estimation. Each of the adapted parameters described above contributes an aspect of improvement to target slip estimation.

The slip limit, lambda, λ, estimations are generally demarked on the Y axis and the time is demarked on the X axis. In a first example, the system 102 quickly (generally under a half second) adapts to toggling around a λ value of 0.3 (502); this provides a fast adaptation to the slip limit λ of 0.3. In the first example, the λ values swing from about 0.34 on the upper limit to about 0.24 on the lower limit.

The functional improvement provided by the projected upper and lower bounds generated by using the system 102 is: they constrain the swing in the slip limit: In a second example, with the slip limit, lambda $\hat{\Theta}(0)=0.3$, the upper bound is 0.31 and the lower bound is 0.28; this is more constrained than the first example. Note, in the second example, the lower bound may be, for example, $-\Delta p+\hat{\Theta}_l(t)=0.02$, and the upper bound is $\hat{\Theta}_u(t)+\Delta p=0.1$. Also note an upper forgetting factor value is 5 (in FIG. 4b) and a lower forgetting factor value is 0.98 (in FIG. 4c), therefore, the $\Delta_f$ is 5–0.98.

The functional improvement provided by utilizing gain, generated by using the system 102, is that, by utilizing adaptation gain, noise attenuation is added.

Thus, the system 102 generates adaptive parameter values reflective of real-time road surface conditions, for use in the target slip estimator module 106. Accordingly, the real-time parameter value adaptation provided by the system 102 provides a functional improvement over conventional approaches to target slip estimation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A system for generating adapted tuning parameters for use by a target slip estimator module in a vehicle, the system comprising:
   a road surface detection module providing a road surface condition, $S_n$, a range of friction, mu, for the $S_n$, and a confidence level, Ci, of the $S_n$, Ci having a value between 0 and 1;
   a sensor system providing sensor system data; and
   a controller module in operative communication with the road surface detection module and the sensor system, and programmed to:
      receive the sensor system data;
      determine an initial gain $P_0$ as a function of signal and noise in the sensor system data;
      receive the $S_n$, the range of mu, and the Ci;
      generate an adapted gain, by tuning $P_0$ as a function of the Ci;
      determine, as a function of $S_n$, range of mu, and Ci, initial estimator values including an estimated initial frictional force, $\hat{\Theta}(0)$, and an initial projected range of signal bounds, ($P_u$ and $P_l$);
      generate an adapted projection range of signal bounds, by constraining $P_u$ and $P_l$ by the $S_n$ and range of mu;
      generate an adapted range of the estimated initial frictional force, $\hat{\Theta}(0)$, by widening the range of the estimated initial frictional force, $\hat{\Theta}(0)$, when the confidence level in the road surface condition is lower than a preprogrammed confidence threshold Ct; and
      output the adapted gain, adapted projection range of signal bounds, and adapted range of frictional force, when the confidence level in the road surface condition is lower than the preprogrammed confidence threshold Ct.

2. The system of claim 1, wherein the controller module is further programmed to:
   compare Ci to the preprogrammed confidence threshold Ct;
   determine that Ci is high when it is $>=$Ct;
   determine that Ci is low when it is <Ct; and
   output the adapted gain, estimated initial projection range of signal bounds, and estimated initial frictional force, when the confidence level in the road surface condition is higher than the preprogrammed confidence threshold Ct.

3. The system of claim 2, wherein the controller module is further programmed to determine, as a function of $S_n$, range of mu, and Ci, an initial forgetting factor, $\beta_0$, for a recursive least squares estimation method.

4. The system of claim 3, wherein the controller module is further programmed to generate an adapted parameter $\beta$ by adapting $\beta_0$ as a function of Ci.

5. The system of claim 4, wherein $S_n$ is one of N road conditions, S, further comprising:
   a database for storing data comprising, for each combination of $S_n$ and Ci: respective initial estimator values; and
   wherein the controller module determines the $\hat{\Theta}(0)$, $\beta_0$, and $P_u$, and $P_l$ by referencing the data using $S_n$ and Ci.

6. The system of claim 5, wherein the controller module generates adaptive parameter $\beta$ by widening $\beta_0$, as a function of Ci when Ci is low.

7. The system of claim 6, wherein the controller module is further programmed to widen the estimated initial frictional force, $\hat{\Theta}(0)$, as a function of Ci when Ci is low.

8. The system of claim 7, wherein the controller module is further programmed to:
   widening the range of the estimated initial frictional force, $\hat{\Theta}(0)$, includes
      generating, as a function of time, a lower widened estimated frictional force value $\hat{\Theta}_l(t)$ and an upper widened estimated frictional force value $\hat{\Theta}_u(t)$;
      adding $\hat{\Theta}_l(t)$ to $P_l$ to widen the initial projected range of signal bounds; and
      adding $\hat{\Theta}_u(t)$ to $P_u$ to widen the initial projected range of signal bounds.

9. A method for generating adapted tuning parameters for a target slip estimator module for a vehicle, comprising:
   at a controller module,
      receiving, from a road surface detection module, a road surface condition, $S_n$, range of friction, mu, for the road surface $S_n$, and a confidence level, Ci for the $S_n$, the Ci being between 0 and 1;
      receiving sensor system data from a sensor system;
      determining an initial gain $P_0$ as a function of signal and noise in the sensor system data;
      generating an adapted gain, by tuning $P_0$ as a function of the Ci;
      determining, as a function of $S_n$, range of mu, and Ci, initial estimator values including an estimated initial frictional force, $\hat{\Theta}(0)$, and an initial projected range of signal bounds, ($P_u$ and $P_l$);
      generating an adapted projection range of signal bounds, by constraining $P_u$ and $P_l$ by the $S_n$ and range of mu;
      generating an adapted range of the estimated initial frictional force, $\hat{\Theta}(0)$, by widening the range of the estimated initial frictional force, $\hat{\Theta}(0)$, when the confidence level in the road surface condition is lower than a preprogrammed confidence threshold Ct; and outputting the adapted gain, adapted projection range of signal bounds, and adapted range of frictional force, when the confidence level in the road surface condition is lower than the preprogrammed confidence threshold Ct.

10. The method of claim 9, wherein $S_n$ is one of N road conditions, S, and further comprising:
storing, in a database, previously developed data comprising, for each combination of $S_n$ and Ci: respective initial estimator values; and
wherein determining the $\hat{\Theta}(0)$, and $P_u$ and $P_l$ comprises referencing the previously developed data using $S_n$ and Ci.

11. The method of claim 10, further comprising:
comparing Ci to the preprogrammed confidence threshold Ct;
determining that Ci is high when it is >=Ct;
determining that Ci is low when it is <Ct; and
outputting the adapted gain, estimated initial projection range of signal bounds, and estimated initial frictional force, when the confidence level in the road surface condition is higher than the preprogrammed confidence threshold Ct.

12. The method of claim 11, further comprising: when the Ci is low,
determining, as a function of time, a widened estimated frictional force value $\hat{\Theta}_l(t)$ and a widened estimated frictional force value $\hat{\Theta}_u(t)$;
adding $\hat{\Theta}_l(t)$ to $P_l$ to widen the initial projected range of signal bounds; and
adding $\hat{\Theta}_u(t)$ to $P_u$ to widen the initial projected range of signal bounds.

13. The method of claim 11, wherein the least squares estimation method employed by the target slip estimator module is recursive least squares, and further comprising:
determining an initial forgetting factor, $\beta_0$; and
generating an adapted tuning parameter, $\beta$, by widening $\beta_0$, as a function of Ci.

14. The method of claim 10, further comprising determining the $\beta_0$ by referencing the data using $S_n$ and Ci.

15. A vehicle, comprising:
a road surface detection module configured to provide a road surface condition, $S_n$, a range of friction, mu, for the $S_n$, and a confidence level, Ci, of the $S_n$, Ci having a value between 0 and 1;
a sensor system configured to provide sensor system data; and
a controller module in operative communication with the road surface detection module and the sensor system, and programmed to:
receive the sensor system data;
determine an initial gain $P_0$ as a function of signal and noise in the sensor system data;
receive the $S_n$, the range of mu, and the Ci;
generate an adapted gain, by tuning $P_0$ as a function of the Ci;
determine, as a function of $S_n$, range of mu, and Ci, initial estimator values including an estimated initial frictional force, $\hat{\Theta}(0)$, and an initial projected range of signal bounds, ($P_u$ and $P_l$);
generate an adapted projection range of signal bounds, by constraining $P_u$ and $P_l$ by the $S_n$ and range of mu;
generate an adapted range of the estimated initial frictional force, $\hat{\Theta}(0)$ la widening the range of the estimated initial frictional force, $\hat{\Theta}(0)$, when the confidence level in the road surface condition is lower than a preprogrammed confidence threshold Ct; and
output the adapted gain, adapted projection range of signal bounds, and adapted range of frictional force when the confidence level in the road surface condition is lower than the preprogrammed confidence threshold Ct.

16. The vehicle of claim 15, wherein the controller module is further programmed to:
compare Ci to the preprogrammed confidence threshold Ct;
determine that Ci is high when it is >=Ct;
determine that Ci is low when it is <Ct; and
output the adapted gain, estimated initial projection range of signal bounds, and estimated initial frictional force, when the confidence level in the road surface condition is higher than the preprogrammed confidence threshold Ct.

17. The vehicle of claim 16, wherein $S_n$ is one of N road conditions, S, and further comprising:
a database for storing previously developed data comprising, for each combination of $S_n$, and Ci: respective initial estimator values; and
wherein the controller module is further programmed to determine the $\hat{\Theta}(0)$, and $P_u$ and $P_l$ by referencing the previously developed data using $S_n$ and Ci.

18. The vehicle of claim 17, wherein the controller module is further programmed to:
determine, as a function of $S_n$, range of mu, and Ci, an initial forgetting factor, $\beta_0$; and
generate an adapted tuning parameter, $\beta$, by widening $\beta_0$, when Ci is low.

19. The vehicle of claim 18, wherein the controller module is further programmed to determine the $\beta_0$ by referencing the data in the database using $S_n$ and Ci.

* * * * *